(12) United States Patent
Provitola

(10) Patent No.: US 6,357,700 B1
(45) Date of Patent: *Mar. 19, 2002

(54) ELECTRICALLY POWERED SPACECRAFT/AIRSHIP

(76) Inventor: Anthony Italo Provitola, P.O. Box 2855, DeLand, FL (US) 32721-2855

( * ) Notice: Subject to any disclaimer, the term of this patent is extended or adjusted under 35 U.S.C. 154(b) by 0 days.

This patent is subject to a terminal disclaimer.

(21) Appl. No.: 09/677,241

(22) Filed: Oct. 2, 2000

(51) Int. Cl.[7] .............................................. B64G 1/40
(52) U.S. Cl. ........................................ 244/172; 244/24
(58) Field of Search ............................ 244/158 R, 172, 244/162, 2, 24, 30, 31, 97, 99

(56) References Cited

U.S. PATENT DOCUMENTS

| | | | |
|---|---|---|---|
| 3,041,824 A | * | 7/1962 | Berhman |
| 3,138,919 A | * | 6/1964 | Deutsch |
| 3,367,114 A | * | 2/1968 | Webb |
| 4,187,506 A | * | 2/1980 | Dickinson |
| 5,503,350 A | * | 4/1996 | Foote |
| 5,890,676 A | * | 4/1999 | Coleman et al. |
| 6,119,983 A | * | 9/2000 | Provitola |

* cited by examiner

Primary Examiner—Charles T. Jordan
Assistant Examiner—T. Dinh

(57) ABSTRACT

An spacecraft/airship, which uses buoyancy and thrusters to ascend into space with lifting gas as propellant or fuel for thrusters, which may be conventional thrusters or electric turbojets or ion thrusters. The airship aspect has gas retaining structures that can regulate the density of the gasses within. The spacecraft aspect provides for mounting thrusters, control, power, services, and interior space for missions of the spacecraft/airship.

22 Claims, 4 Drawing Sheets

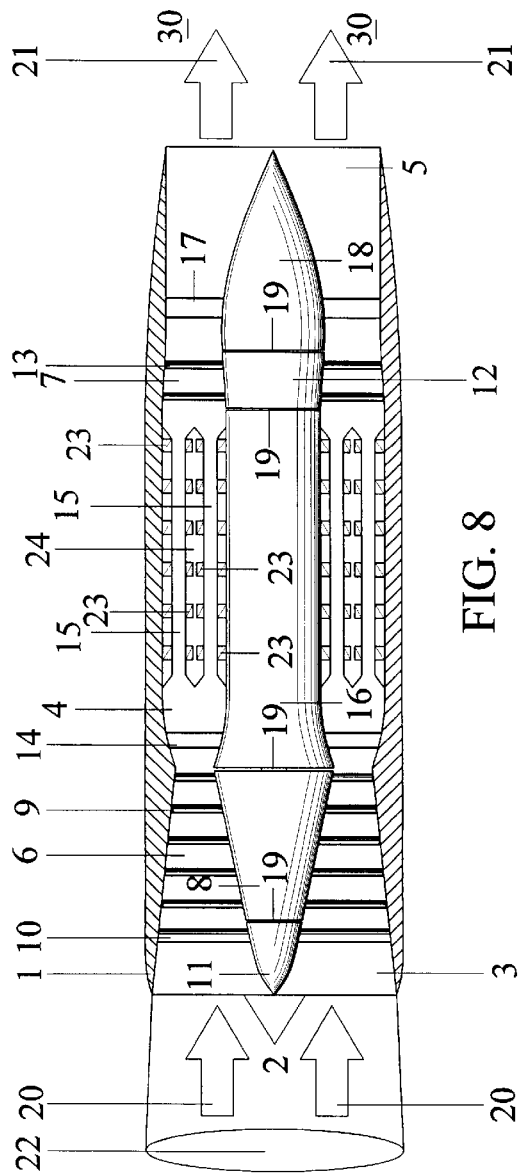
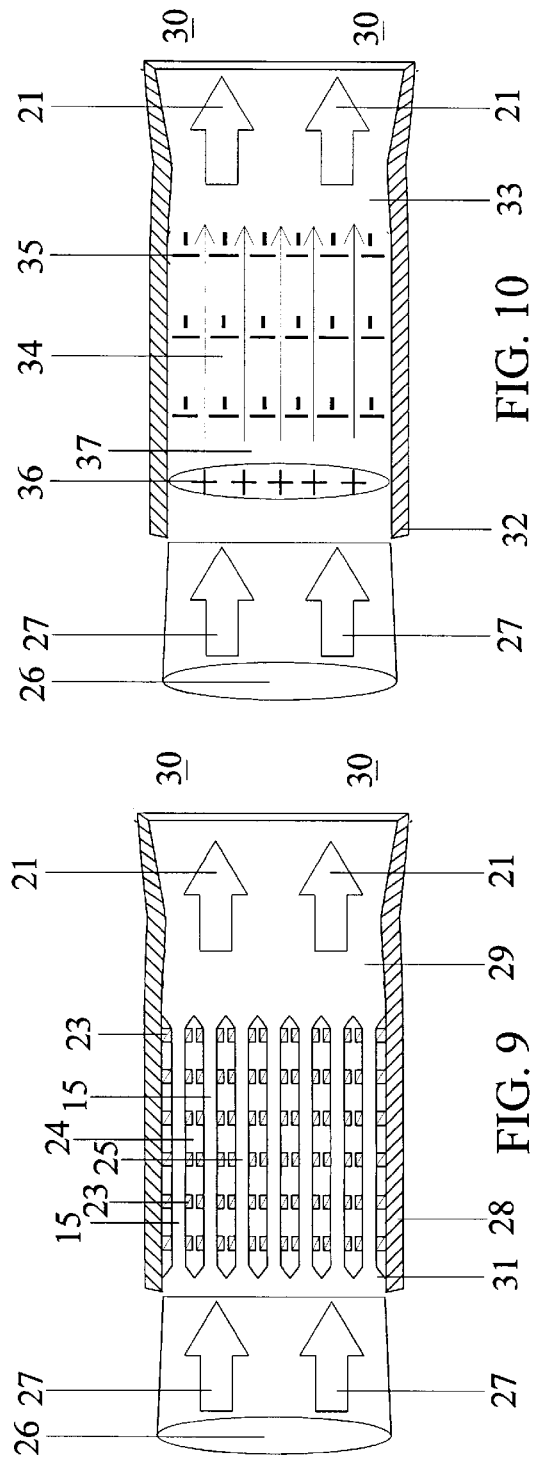
FIG. 8
FIG. 9
FIG. 10

ELECTRICALLY POWERED SPACECRAFT/AIRSHIP

CROSS-REFERENCE TO RELATED APPLICATIONS

U.S. patent application Ser. Nos. 09/276665, 09/276666 (currently fully allowed and part of the disclosure presented in an International Application No. PCT/US00/07338), and Ser. No. 09/676639; and U.S. Pat. No. 6,148,609.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

The present invention is a combination airship and spacecraft that uses its lifting gas as propellant for electrically powered thrusters to achieve space flight, such electric power being supplied by beamed microwave energy from the planet surface or from space. Such electric power may also be used to heat atmospheric, lifting, propellant and fuel gases contained by the spacecraft/airship as well. The airship aspect operates to provide lift with lifting gas in one or more gas retaining structures that may change in volume. The spacecraft aspect provides control, power, services, and interior space for missions of the spacecraft/airship. An spacecraft/airship may be connected with others to form larger space structures and spacecraft.

Additional background is reviewed in U.S. Pat. No. 6,119,983, Airship/spacecraft, which is incorporated herein by this reference.

Background of the present invention is with respect to methods of providing electric power through space, within and outside of a planetary atmosphere, was reviewed in the article Beamed Microwave Power Transmission and Its Application to Space, excerpted from IEEE Transactions on Microwave Theory and Techniques, Vol. 40, No. 6, June 1992, by William C. Brown and E. Eugene Eves, "a tutorial overview" as described therein, hereinafter referred to as "Brown and Eves".

The present invention has elements that are covered generally by class 244, aeronautics, and may be considered under the following subclasses: 3, compound aeronautical machines; 12.2, circular; 12.3, dual propulsion; 12.4, thrust tilting; 24 miscellaneous aircraft; 29, propelled aeronautical machines; 61, aircraft power plants adapted to use the sustaining gas of an airship as fuel; 97, devices for changing buoyancy of lighter-than-air craft; 125, construction of hull and internal structure of lighter-than-air craft; 126, construction of outer surface of lighter-than-air craft; and, 158, machine or structure designed for travel in the upper reaches of and/or beyond the atmosphere of a celestial body. Also to be considered is class 60, power plants, particularly subclasses 203 and 204.

BRIEF SUMMARY OF THE INVENTION

The present invention is an spacecraft/airship that may use its lifting gas as propellant and as fuel for thrusters, electrically powered and fuel burning, to achieve transition from airship operation to space flight. Such thrusters may be propellant driven, fueled, or nuclear or electrically powered, which may in turn be ramjet, turbo-type, rocket type, including ion thrusters, and/or a hybrid of those types. Propeller thrusters may also be used for low altitude stabilization and maneuver.

The lifting component of the airship comprises one or more gas retaining structures which may maintain a lower pressure than exists external to the structure. A gas retaining structure may have its own framework in order to restrict or allow for expansion and contraction. A gas retaining structure may also have a framework which is dynamic, allowing for controlled changes of volume and shape of the framework and redistribution of framework stress. A gas retaining structure may also be compound, that is, comprised of a plurality of other gas retaining structures having one or more of the characteristics described above. The preferred embodiment integrates a microwave antennae for receiving beamed microwave energy with the gas retaining structures in order to supply the spacecraft/airship and its electrically powered thrusters with electric power.

The spacecraft/airship may include dynamic gas retaining structures with expandable frameworks and gas heating to maximize the altitude to which the lifting gas will be effective to lift the airship. The present invention may use the lifting gas as propellant for electrically powered thrusters, such as ion thrusters and arcjets, as well as fuel for other types of thrusters, such as conventional and turbo-rocket, which then power on the flight of the entire spacecraft/airship. Electrical power for thrusters and heating of gas in the gas retaining structures or other containers may be provided by beamed microwave from the planet surface or from other spacecraft. The present invention provides a single-stage launch vehicle which can use the airship structures as components of space-frames and larger spacecraft.

The preferred embodiment places the thrusters on a structure which may include controls, machinery, tanks for propellant, fuel, and/or oxidizer, and space for crew, passengers, cargo, or equipment, or all of them, which shall be hereinafter referred to as the spacecraft body. The spacecraft body may be separate from but connected to a gas retaining structure, or may be connected by integration with one or more gas retaining structures.

Objects of the invention are to provide: an airship which has sufficient buoyancy to rise vertically to an altitude of neutral buoyancy in the region of the stratosphere/ionosphere; a spacecraft/airship which uses its lifting gas as propellant and/or fuel for thrusters to power it to space flight; and, a spacecraft/airship that can descend at planetary destinations from space flight as an atmospherically buoyant craft. It is also an object of the invention to reduce g-forces and atmospheric friction heating during ascent and descent.

BRIEF DESCRIPTION OF THE DRAWINGS

FIG. 8 is a longitudinal sectional view illustrating an electric thruster.

FIG. 9 is a longitudinal sectional view illustrating an electric arc thrust augmenter.

FIG. 10 is a longitudinal sectional view illustrating an ion accelerator thrust augmenter.

DETAILED DESCRIPTION OF THE INVENTION

The present invention is combination airship and spacecraft, a "spacecraft/airship", that uses its lifting gas as propellant for electrically powered thrusters, and may employ other types of thrusters, including conventional turbojets and rockets and such as those disclosed in U.S. Pat. No. 6,119,983, entitled "Airship/spacecraft", hereinafter referred to as 6,119,983, which is incorporated herein by this reference for all that it teaches. Electrical power for the preferred embodiment of the invention is provided by beamed transmission of microwave energy from the planet surface or from other spacecraft in space. Such a method of providing electric power through space, within and outside of a planetary atmosphere, is well known and within current art, and was reviewed in "Brown and Eves". The electrically powered thrusters which may be employed in the present invention are of the ion thruster type and arcjet type. The arcjet type may be in the configuration of a turbojet or ramjet, either in a primary stage or, or as a thrust augmenter in a secondary or final stage for other types of thrusters, and is disclosed in the United States Patent Application entitled "Electric Thruster and Thrust Augmenter", Filed on Sept. 30, 2000 and now pending, which is incorporated herein by reference for all that it teaches. Another thrust augmenter that is disclosed in "Electric Thruster and Thrust Augmenter" uses the exhaust of a reaction thruster as propellant, the positive ions of which are accelerated electrostatically or electromagnetically in order to increase the velocity of the exhaust of the reaction thruster.

The lifting component of the airship is comprised of one or more gas retaining structures, which may be flexible, as in the case of balloons and blimps; semirigid, as in the case of a gas retaining structure that is partially or completely supported by a framework; or rigid, as in the case of dirigibles, in which a framework supports a hull, which itself may be a gas retaining structure, to contain other gas retaining structures such as flexible gas bags. A gas retaining structure may also be a combination of the types described above.

The airship feature of the present invention may also have a gas retaining structure with an integrated framework to restrict expansion and contraction or allow for flexion, expansion, and contraction of the structure. An example of such a structure is shown in the diagrammatic view of the spacecraft/airship shown in FIG. 1 in which the framework of the gas retaining structure is constructed of toroidal elements. Such a framework may also be employed in a hull structure that contains gas bags, or be integrated with gas bags. Such a framework may also be dynamic, to effect controlled changes of size and shape of the framework and redistribution of framework stress. Other forms of gas retaining structures may be employed as disclosed in U.S. Pat. No. 6,119,983.

Figure 1:
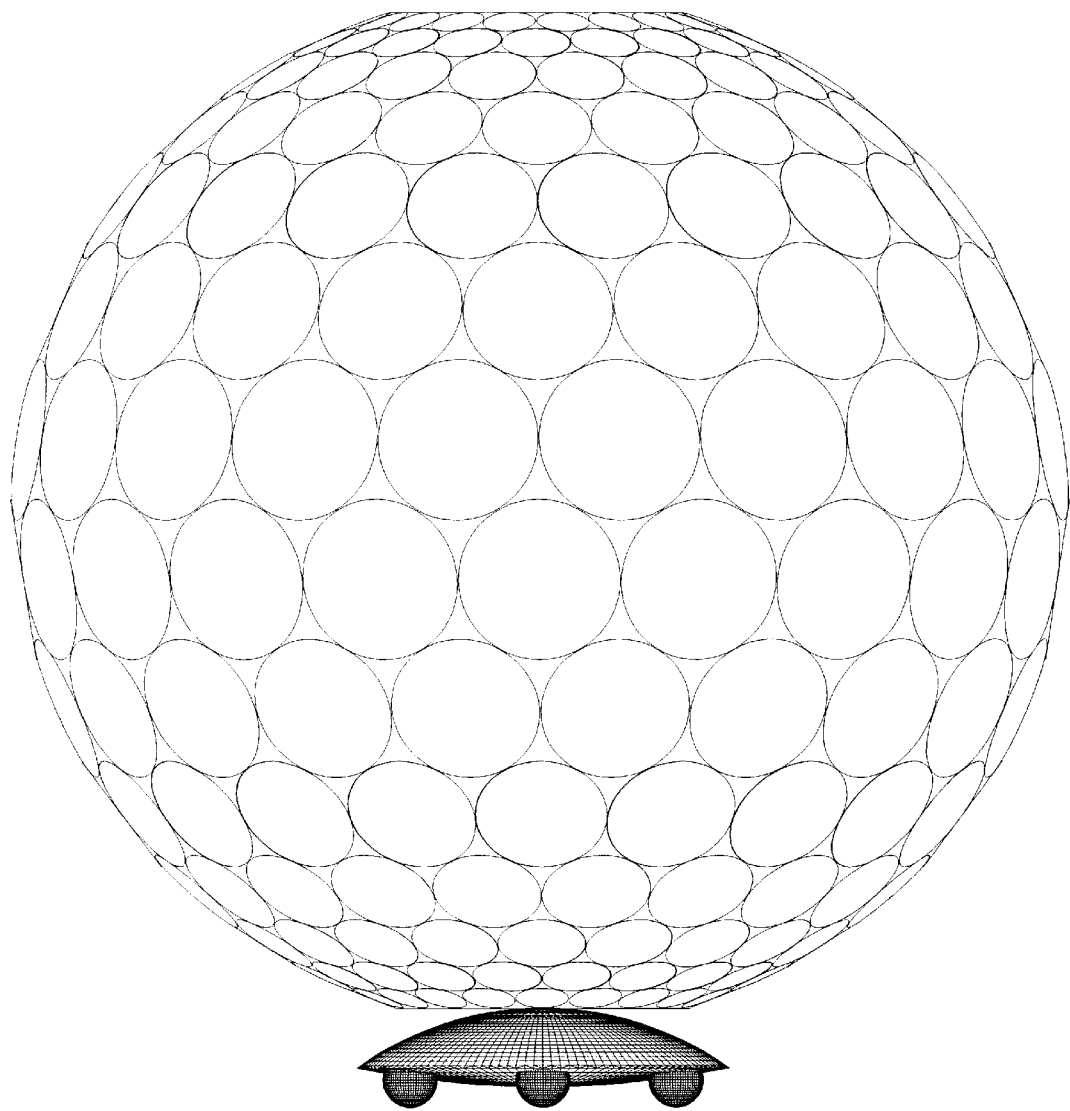
FIG. 1 is a diagrammatic side view of the spacecraft/airship.
Figure 2:
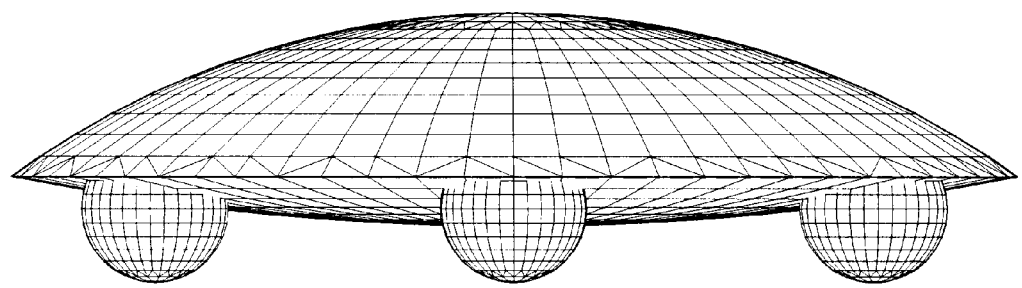
FIG. 2 is a diagrammatic side view of the spacecraft body of the spacecraft/airship shown in FIG. 1.
Figure 3:
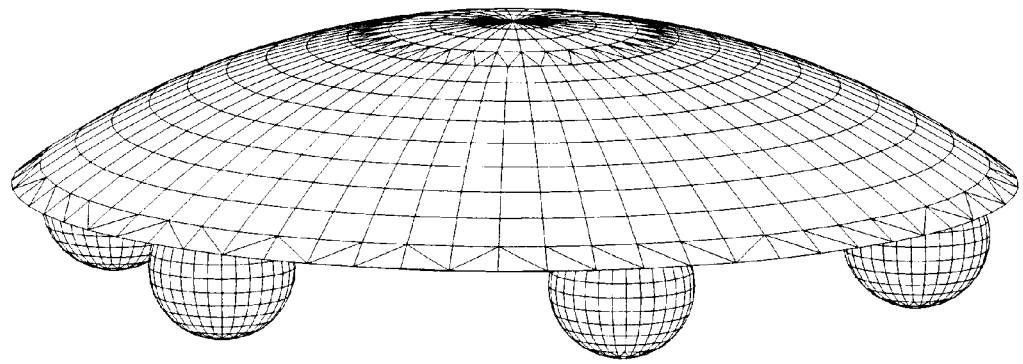
FIG. 3 is a diagrammatic perspective view from above of the spacecraft body shown in FIG. 2.
Figure 4:
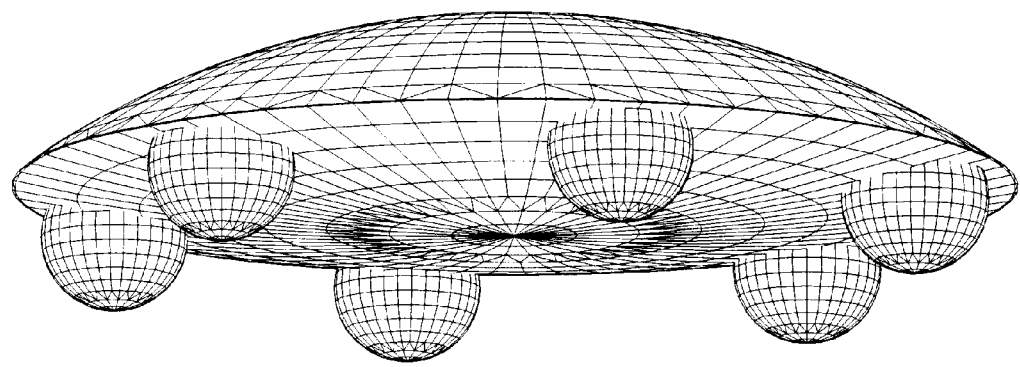
FIG. 4 is a diagrammatic perspective view from below of the spacecraft body shown in FIG. 2.
Figure 5:
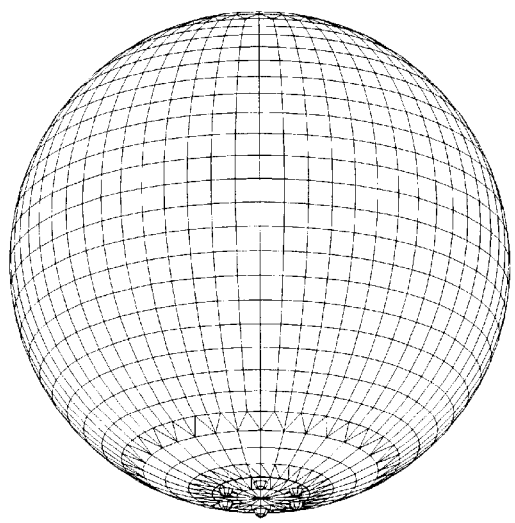
FIG. 5 is diagrammatic perspective view from below of an spacecraft/airship with a structurally integrated spacecraft body.
Figure 6:
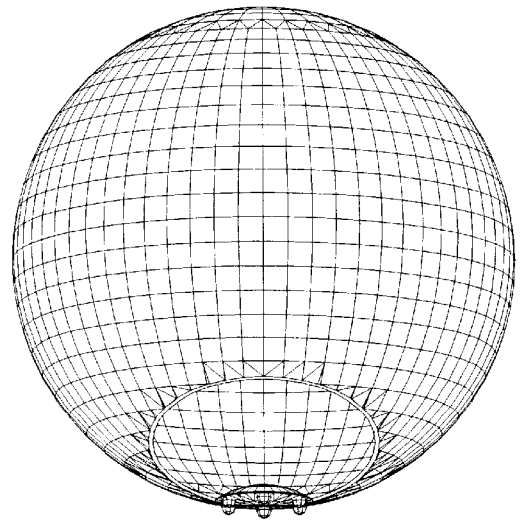
FIG. 6 is a diagrammatic perspective cutaway view from below of the spacecraft/airship shown in FIG. 5.
Figure 7:
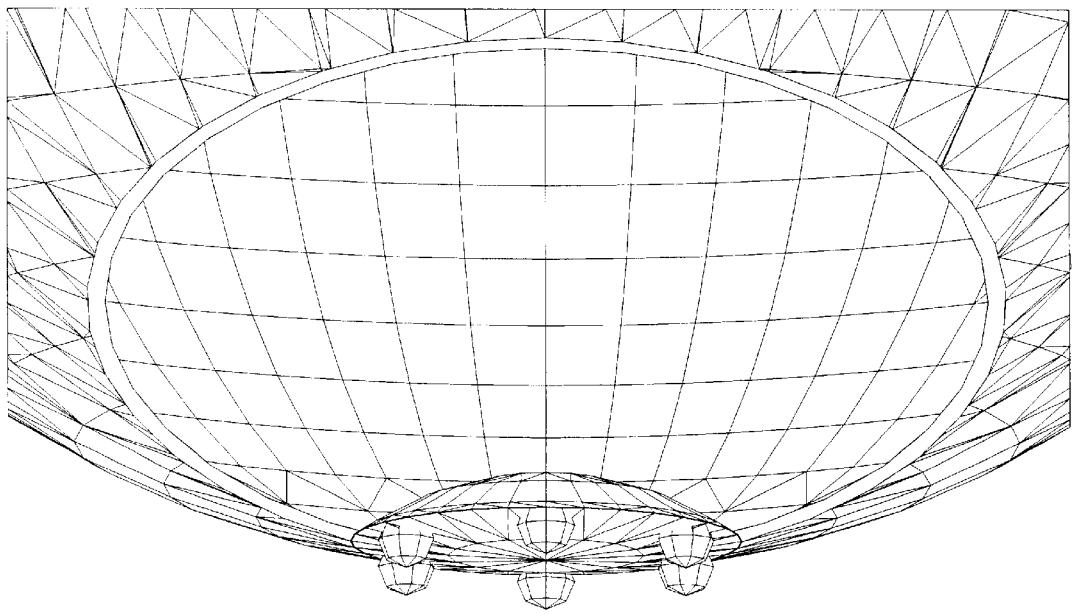
FIG. 7 is a fragmentary view of the region of cutaway shown in FIG. 6.

The preferred embodiment places the thrusters on a structure which may include controls, machinery, tanks for propellant, fuel, and/or oxidizer, and interior space for crew, passengers, cargo, or equipment, or all of them, which shall be hereinafter referred to as the spacecraft body. The spacecraft body may be separate from but connected to the gas retaining structure as shown in FIG. 1, or may be connected to a gas retaining structure by integration therewith. An example of a spacecraft body, which is shown diagrammatically in FIGS. 1–4, has thrusters which are shown as spherical structures partially imbedded in the structure of the spacecraft body. Although the preferred embodiment separates the functions of the spacecraft body from the gas retaining structure, one or more functions of the spacecraft body can be integrated with a gas retaining structure. Indeed, the spacecraft body structure may even be a compartment of a gas retaining structure, as shown in FIGS. 5–7. The spacecraft body may include propellant, fuel and/or oxidizer supplies for thrusters, and may itself be a heavier-than-air lifting body, as shown in FIGS. 2–4, capable of gliding or powered flight. Control surfaces for aerodynamically controlling the spacecraft body in aerodynamic flight can be included for such operation.

As stated in "Electric Thruster and Thrust Augmenter" the "electric thruster" is a reaction thrusting power plant which uses electric arcing to heat compressed or previously energized gases, such as compressed atmospheric gases, and exhausts such gasses in order to create thrust with electric power as the prime source of energy for heating and therefore imparting momentum to the exhaust gases. The electric thruster uses an electric arc in an arc chamber to heat compressed intaken gases in order to energize them sufficiently to produce thrust. Elements of such an electric thruster may also be configured with most other types of reaction thrusters to add velocity to their thrusting exhaust as a thrust augmenter. Also, because of the high temperatures generated, the gases heated by electric arc are partially ionized, and additional acceleration of the overall mass of the exhaust gases may be achieved with an ion accelerator, such as those used in ion thrusters.

Also as stated in "Electric Thruster and Thrust Augmenter" "[t]he electric thruster illustrated in FIG. 8 includes a duct casing 1 which defines a gas duct 2, which in turn defines a gas intake 3, an arc chamber 4, and an exhaust nozzle 5, and surrounds an axial compressor stage 6, an arc chamber stage 4, and an axial turbine stage 7. The axial compressor stage 6 has at least one compressor rotor 8 having a plurality of compressor blades 9 extending radially therefrom. The compressor rotor 8 of the axial compressor 8 and 9 is located downstream of first stator guide vane 10 which supports a first hub 11 coaxially with the longitudinal axis of the gas duct 2 to rotatably support the compressor rotor 8. The axial compressor 8 and 9 is driven via a shaft 19 by the axial turbine stage 7, which includes at least one turbine rotor 12 with a plurality of turbine blades 13 extending radially therefrom. The axial turbine 12 and 13 is driven by the gases heated by the arc in the gap space 15 between pairs of electrodes 23 on the electrode bases 24, which then pass across the turbine blades 13. The second stator guide vane 14 supports a second hub 16 coaxially with the longitudinal axis of the gas duct 2 to also rotatably support the compressor rotor 8 with the first hub 11. The turbine rotor 12 of the axial turbine 12 and 13 is located upstream of a third stator guide vane 17, which supports a third hub 18 coaxially with the longitudinal axis of the gas duct 2 to also rotatably support, together with the second hub 16, the turbine rotor 12."

As further stated in "Electric Thruster and Thrust Augmenter" "[t]he operation of the electric thruster commences with the intaking of gases drawn from the atmosphere 20 by the axial compressor 8 and 9. With compression by the axial compressor 8 and 9 the atmospheric gases are sent to an arc chamber 4 to be channeled into gap spaces 15 between pairs of electrodes 23, each pair supporting an electric arc across a gap space 15 of sufficient intensity to rapidly heat and expand the atmospheric gases. The pairs of electrodes 23 may be in a linear arrangement along the electrode bases 24, which are parallel to the axis of the gas duct 2, so that the gases flowing through the gap spaces 15 may be heated by arcs from more than one pair of electrodes 23 sequentially, resulting in higher temperatures and velocity of the gases. In this manner the amount of arcing to which the compressed gasses are subjected may be regulated by increasing or decreasing the number of pairs of electrodes which are arcing. The energetic products of the arc heating of the gases then flow through and power the axial turbine 12 and 13, which is connected to and powers the axial compressor 8 and 9 via a shaft 19 and/or transmission. The energetic exhaust gasses 21 then exit from the exhaust nozzle 5 to the space outside 30 the gas duct 2 to provide reaction thrust. With such an increase or decrease in the number of arc pairs arcing, the thrust of the electric thruster may be increased or decreased respectively."

"Atmospheric gases may be supplied to the turbine compressor 8 and 9 directly by intaking from the atmosphere or from an atmospheric gas reservoir by at least one gas duct 22. The process of supplying atmospheric gases to the electric thruster may be assisted by electromagnetically accelerating the atmospheric gases to the intake, pumping, including ultrasonic pumping, pre-compression, and/or contraction of the atmospheric gas reservoir. Atmospheric gases may also be supplied directly to the arc chamber when they are sufficiently compressed by the forward motion of the electric thruster through the atmosphere, without precompression by a turbine compressor, which is the case in the "ram arcjet" embodiment of the invention, not shown in the figures (as it can be easily visualized from FIG. 8 with the elimination of the turbine components)."

Shown in FIG. 9 (and quoting from "Electric Thruster and Thrust Augmenter") "is a thrust augmenter stage which may be used in tandem with any type of reaction thruster which exhausts gases, the velocity of which may be increased by electric arcing through the gases. The casing 28 is joined with the last stage of the reaction thruster to be augmented, and forms the arc chamber 31, containing the electrodes 23 arranged in pairs on electrode bases 24 across gap spaces 15, and the exhaust nozzle 29. As in the case of the electric thruster the gases exhausted 27 by the energizing process of the reaction thruster 26 to be augmented are channeled into gap spaces 15 between pairs of electrodes 23, each pair supporting an electric arc across a gap space of sufficient intensity to rapidly heat and expand the previously energized gases 27. As with the electric thruster the pairs of electrodes 23 may be in a linear sequence along the electrode bases, so that the gases flowing through the gap spaces 15 may be heated by arcs from one or more pairs of electrodes 23 sequentially, resulting in a greater velocity of the gases. The energetic exhaust gasses 21 then exit from the exhaust nozzle 29 to the space outside the gas duct 30 to provide reaction thrust."

Shown in FIG. 10 is an ion accelerator thrust augmenter, (quoting from "Electric Thruster and Thrust Augmenter") "which may be used as a final stage of the electric thruster or in tandem with other types of reaction thrusters to further increase the velocity of exhaust gases to increase thrust. The ion accelerator thrust augmenter operates in the nature of the well known ion thruster, which accelerates an ionized gas produced by an ionization chamber. The ion accelerator thrust augmenter, however, accelerates the positively charged ions in a moving heated gas that is the exhaust of another reaction thruster, instead of accelerating an ionized gas from an ionization chamber. The casing 32 is joined with the last stage of the reaction thruster 26 to be augmented, and defines the ion acceleration chamber 34, containing negatively charged grids 35, and the exhaust nozzle 33. The positively charged ions 36 in the exhaust 27 of a reaction thruster 26 are accelerated by negatively charged grids 35 or radio-frequency waves through the ion acceleration chamber 34, which increases the velocity of the thrust producing exhaust 21 to the space outside the gas duct 37 to provide augmented reaction thrust. The negatively charged grids 35 may be arranged to have successively greater negative charge, i.e. greater negative potential or voltage, from one grid to the next from the intake end to the exhaust end of the thrust augmenter, to enhance the acceleration of the positively charge ions."

Another feature of the preferred embodiment integrates microwave antennae for receiving beamed microwave energy, such as the "rectenna" described in Brown and Eves, with the gas retaining structures or the spacecraft body in order to supply the spacecraft/airship and its thrusters, with electric power. An example of such a "rectenna" is a thin-film, etched-circuit configuration, also described as within current art in Brown and Eves, for which the large surface areas of the gas retaining structures may serve as a base and thereby provide an advantage in high exposure to microwave beams.

The principal object of the invention is to provide an airship which has sufficient buoyancy to rise vertically to and beyond an altitude of neutral buoyancy in the region of the stratosphere/ionosphere and higher. If the region of the atmosphere at which the vehicle reaches neutral buoyancy has sufficient atmosphere for compression in an atmospheric compressing thruster, thrust from one or more such thrusters may be used to further the ascent of the airship. Where the atmosphere compressing thrusters cannot function because of insufficient atmosphere, thrusters which utilize stored propellant, which may be a lifting gas or even an atmospheric gas, are used to further the ascent of the airship. During the application of thrust the flight path of the spacecraft/airship may be controlled by directing the thrust.

Up to the point of the application of thrust, and by reason of operation in an atmosphere of sufficient density to provide buoyancy, the spacecraft/airship is operated as an airship. However, when the effect of buoyancy becomes insignificant, the spacecraft/airship must be operated as a thruster powered spacecraft. The point of transition from operation as an airship depends in part on the altitude at which the airship reaches neutral buoyancy, which is the altitude at which the density of the lifting gas will no longer alone provide a buoyant force to contribute to the ascent of the airship. However, even at and above the altitude of neutral buoyancy, buoyant forces will still contribute to lessen the thrust required to reach a specific acceleration of the spacecraft/airship. The altitude of neutral buoyancy may be controlled by the regulation of the density of the gas in gas retaining structures, either by venting to the atmosphere, rarefaction by pumping gas out, or by increasing the volume of gas retaining structures, all as disclosed in U.S. Pat. No. 6,119,983, or by heating with electric power received by beamed microwave. The gasses which may be thus rarified for augmenting buoyancy include hydrogen, helium, and atmospheric gases such as nitrogen, oxygen, ammonia, and carbon dioxide.

The preferred lifting gas for the airship phase is diatomic hydrogen, which provides the greatest lift and is a commonly used rocket fuel and ion thruster propellant. The lifting force of diatomic hydrogen in air at sea level, both being at standard temperature and pressure, is approximately 68 pounds per 1,000 cubic feet of hydrogen.

The ascent of the airship into space as a spacecraft is a result of its operation as a spacecraft under thruster power. With hydrogen as a lifting gas, hydrogen may be used as propellant or fuel at any time during the airship phase of the ascent. Secondary to being the lifting gas, hydrogen gas can be used as a propellant or fuel for thrusters in the transition from airship to spacecraft, and then can be used as propellant or fuel in the spacecraft phase. As buoyancy decreases within the atmosphere above the altitude of neutral buoyancy, electric turbojet engines powered by beamed microwave from ground based installations may be employed to take advantage of the mass of the atmospheric gasses in the atmosphere remaining to provide thrust. As the atmospheric density diminishes with altitude, a transition to ion thrusters which use lifting gas as propellant, powered by beamed microwave from ground or space based installations, are then employed to power on the flight of the spacecraft/airship into space. Such ion thrusters may also be used to power the flight of the spacecraft/airship, even at lower altitudes, either as autonomous thrusters or as thrust augmenters in the final thrust stage for another type of thruster. As hydrogen is consumed by the thrusters in the transition from airship to spacecraft, several effects occur which act to assist in the extension of the ascent of the airship: firstly, when hydrogen is pumped out to the thrusters, with the volume of the involved gas retaining structure maintained, the density of the hydrogen in the gas retaining structure is reduced, resulting in the buoyant prolongation of the ascent; secondly, the total mass of the airship is reduced by the consumption of hydrogen consumed by the thrusters from the gas retaining structure, resulting in a lesser and lessening gravitational force on the airship; and thirdly, the reduction of the total mass of the airship results in a greater and increasing acceleration of the airship for a given strength of thrust.

The process of supplying hydrogen, or other lifting gas that maybe used as propellant or fuel to thrusters may be assisted by electromagnetically accelerating the gas to the intake, pumping, including ultrasonic pumping, and pre-compression. Contracting the gas retaining structures or electrically or otherwise heating are other means for assisting the extraction of gas from gas retaining structures for supplying propellant, fuel, and/or oxidizer to the thrusters.

The above examples of thrusters, although a part of the operation of the present invention, are currently the subject of a separate applications for a United States Patent by the present applicant, the most recent being the application for the invention entitled "Electric Thruster and Thrust Augmenter" filed Sep. 30, 2000, and application Ser. No. 09/321,796, currently fully allowed (and part of the disclosure presented in the International Application No. PCT/US00/09617, which claims priority from Ser. No. 09/321,796).

In the case of the present invention g-forces in the buoyant ascent through the atmosphere to space flight would be significantly moderated by the lack of the necessity for the rapid burn-off of massive propellant or fuel during that phase of operation, inasmuch as activation of the thrusters is not necessary until after the airship has reached neutral buoyancy and beyond. Indeed, the airship may have significant upward momentum at the point of neutral buoyancy, having accelerated upward during buoyant ascent in overcoming gravitational force. The regulation of such acceleration of the spacecraft/airship during buoyant ascent by the regulation of the buoyancy is inherent in the airship aspect of the present invention.

The reduction of the level of g-forces in comparison with current methods of descent to a planetary surface from space flight can be accomplished with controlled deceleration by retrofiring of thrusters, rather than by uncontrolled atmospheric braking. Again, such thrusters in use in the space environment may be ion thrusters powered by beamed microwave energy from space or the planetary surface. By such retrofiring of thrusters the speed of the spacecraft/airship is slowed to the extent that airship buoyancy will provide the needed braking for descent. Neutral buoyancy may occur at a higher altitude as a result of the lower density of the gases in one or more gas retaining structures. When the atmosphere becomes sufficiently dense, electric turbojets may then be employed to take advantage of the ambient atmosphere as propellant, again powered by beamed microwave energy. The gas retaining structures may contain hydrogen that was collected in space or unconsumed in the ascending flight, and thus available as propellant or fuel for thrusters for further retrofiring. The gas retaining structures may also have hydrogen and atmospheric gases in separate compartments of one or more of gas retaining structures. The rest of the descent is then accomplished as an airship using the atmosphere as ballast by gradually increasing the density of gas within one or more gas retention structures as the spacecraft/airship descends into denser atmosphere.

While the invention has been disclosed in connection with a preferred embodiment, it will be understood that there is no intention to limit the invention to the particular embodiment shown, but it is intended to cover the various alternative and equivalent constructions included within the spirit and scope of the appended claims.

What I claim as my invention is:

1. An spacecraft/airship comprising:
    (a) one or more gas retaining structures;
    (b) a spacecraft body connected to one or more gas retaining structures;
    (c) one or more lifting gasses;
    (d) one or more electrically powered thrusters;
    (e) means for supplying a lifting gas from one or more gas retaining structures to said one or more electrically powered thrusters; and
    (f) a means of supplying electric power to said one or more electrically powered thrusters.

2. The spacecraft/airship of claim 1 wherein the gas retaining structures are torsion structures.

3. The spacecraft/airship of claim 1 wherein said one or more lifting gasses are propellants for said one or more electric thrusters.

4. The spacecraft/airship of claim 1 wherein said one or more electric thrusters are ion thrusters.

5. The spacecraft/airship of claim 1 wherein the spacecraft body includes microwave antennae for receiving beamed microwave energy.

6. The spacecraft/airship of claim 1 wherein one or more gas retaining structures include microwave antennae for receiving beamed microwave energy.

7. The spacecraft/airship of claim 1 further comprising a means for direction of the thrust of one or more of the thrusters.

8. The spacecraft/airship of claim 1 wherein the means for supplying electric power to said one or more electrically powered thrusters comprises beamed microwave energy.

9. The spacecraft/airship of claim 8 wherein the source of beamed microwave energy is on a planetary surface.

10. The spacecraft/airship of claim 8 wherein the source of beamed microwave energy is in space.

11. The spacecraft/airship of claim 1 further comprising a means for controlling the density of the gas in one or more of the gas retaining structures.

12. The spacecraft/airship of claim 11 wherein the means for controlling the density of the gas in one or more of the gas retaining structures is by heating the gas in said one or more of said gas retaining structures.

13. The spacecraft/airship of claim 1 wherein said one or more electrically powered thrusters are reaction thrusting power plants which uses electric arcing to heat and expand intaken compressed gasses.

14. The spacecraft/airship of claim 13 wherein said one or more electrically powered thrusters are turbojet thrusters.

15. The spacecraft/airship of claim 13 wherein said one or more electrically powered thrusters are ramjet thrusters.

16. A system for sub-orbital, orbital, and extra-orbital space flight from a planetary surface with a combination airship and spacecraft, comprising:
   (a) an airship means;
   (b) a spacecraft means;
   (c) means for regulating the buoyancy of the combination airship and spacecraft to control the ascent of the combination airship and spacecraft as an airship;
   (d) electric thruster means for creating upward thrust on the combination airship and spacecraft during the ascent of the combination airship and spacecraft;
   (e) means for receiving beamed microwave energy for supplying the combination airship and spacecraft with electric power; and
   (f) means for beaming microwave energy to the combination airship and spacecraft; so that the ascent of the combination airship and spacecraft into space is initiated with upward thrust from buoyancy of the combination airship and spacecraft when the planetary atmosphere is sufficiently dense to provide buoyancy, and then continued into space by the activation and operation of thrusters.

17. The system for space flight of claim 16 wherein operation of the combination airship and spacecraft during ascent includes the employment of electric turbojet engines powered by beamed microwave from ground based installations as buoyancy decreases within the atmosphere above the altitude of neutral buoyancy, and employment of ion thrusters which use lifting gas as propellant powered by beamed microwave as the atmospheric density diminishes with altitude.

18. The system for space flight of claim 16 which includes a transition of beamed microwave power reception from one or more sources of beamed microwave power on the planetary surface to one or more sources of beamed microwave power in space to power on the flight of the combination airship and spacecraft into space.

19. The system for space flight of claim 16, further comprising a means for heating the gasses contained in the combination airship and spacecraft.

20. The system for space flight of claim 19 wherein the means for heating gasses contained in combination airship and spacecraft is electrically powered.

21. The system for space flight of claim 19 wherein the means for regulating the buoyancy of the combination airship and spacecraft also regulates the upward acceleration of the combination airship and spacecraft during ascent.

22. An spacecraft/airship comprising:
   (a) one or more gas retaining structures;
   (b) a spacecraft body connected to one or more gas retaining structures;
   (c) one or more lifting gasses;
   (d) one or more electrically powered thrusters;
   (e) means for supplying a lifting gas from one or more gas retaining structures to said one or more electrically powered thrusters;
   (f) means for receiving beamed microwave energy for supplying the combination airship and spacecraft with electric power; and
   (g) means for beaming microwave energy to the combination airship and spacecraft.

* * * * *